United States Patent
Hamada (10) Patent No.: US 9,928,695 B2
(45) Date of Patent: Mar. 27, 2018

(54) REGISTER SYSTEM THAT TRACKS A POSITION OF A CUSTOMER FOR CHECKOUT

(71) Applicant: TOSHIBA TEC KABUSHIKI KAISHA, Tokyo (JP)

(72) Inventor: Kentaro Hamada, Izunokuni Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/409,250

(22) Filed: Jan. 18, 2017

(65) Prior Publication Data
US 2017/0213427 A1 Jul. 27, 2017

(30) Foreign Application Priority Data
Jan. 21, 2016 (JP) .................................. 2016-010128

(51) Int. Cl.
*G06K 15/00* (2006.01)
*G07G 1/00* (2006.01)
*G06Q 20/20* (2012.01)
*G07G 5/00* (2006.01)

(52) U.S. Cl.
CPC .......... *G07G 1/0045* (2013.01); *G06Q 20/202* (2013.01); *G06Q 20/206* (2013.01); *G06Q 20/209* (2013.01); *G07G 5/00* (2013.01)

(58) Field of Classification Search
CPC ..... G07G 1/0045; G07G 55/00; G06Q 20/209
See application file for complete search history.

(56) References Cited

U.S. PATENT DOCUMENTS

| 4,779,706 A | * | 10/1988 | Mergenthaler | .......... A47F 9/047 177/25.15 |
| 5,250,941 A | * | 10/1993 | McGregor | ............ G06M 1/108 340/12.18 |
| 6,354,496 B1 | * | 3/2002 | Murphy | ............... G06Q 20/343 235/380 |
| 6,712,268 B1 | * | 3/2004 | Mason | ............. G06F 17/30879 235/380 |
| 7,416,117 B1 | * | 8/2008 | Morrison | .................. A47F 9/04 186/61 |

(Continued)

FOREIGN PATENT DOCUMENTS

JP 2011158993 A 8/2011

*Primary Examiner* — Thien M Le
*Assistant Examiner* — Asifa Habib
(74) *Attorney, Agent, or Firm* — Patterson & Sheridan, LLP (57) ABSTRACT

A register system includes an image capturing device set to capture images of a checkout space of a retailer, a first register disposed in the checkout space, and configured to scan product codes of products and generate checkout information based on the scanned product codes, a second register in communication with the first register, disposed in the checkout space separately from the first register, and configured to carry out payment processing, and a server in communication with the first and second registers. The server is configured to process the images captured by the image capturing device to transmit the checkout information collected by the first register to the second register upon detecting movement of a person in the images from the first register to the second register.

18 Claims, 7 Drawing Sheets (56) References Cited

U.S. PATENT DOCUMENTS

| | | | | |
|---|---|---|---|---|
| 7,466,231 | B1* | 12/2008 | Seevers | G07G 1/0054 |
| | | | | 186/35 |
| 7,575,162 | B1* | 8/2009 | Malchak | A47F 9/047 |
| | | | | 235/375 |
| 9,033,227 | B2* | 5/2015 | Kobres | G01G 19/4144 |
| | | | | 235/383 |
| 9,473,747 | B2* | 10/2016 | Kobres | G06Q 30/00 |
| 2010/0158310 | A1* | 6/2010 | McQueen | G06K 9/00 |
| | | | | 382/100 |
| 2014/0365334 | A1* | 12/2014 | Hurewitz | G06Q 30/0613 |
| | | | | 705/26.41 |
| 2015/0242899 | A1* | 8/2015 | Farhi | G06Q 30/0261 |
| | | | | 705/14.58 |

* cited by examiner

REGISTER SYSTEM THAT TRACKS A POSITION OF A CUSTOMER FOR CHECKOUT

CROSS-REFERENCE TO RELATED APPLICATION

This application is based upon and claims the benefit of priority from Japanese Patent Application No. 2016-010128, filed Jan. 21, 2016, the entire contents of which are incorporated herein by reference.

FIELD

Exemplary embodiments described herein relate generally to a register system.

BACKGROUND

A checkout system (register system) of a semi-self-type includes a register that carries out product registration and a payment apparatus (checkout apparatus) that carries out payment processing in a supermarket or the like. In the checkout system, the operation of the register is usually performed by a store clerk, and the operation of the payment apparatus is usually performed by a shopper, respectively.

Also, payment amount for a transaction is transmitted from the register to the payment apparatus for the payment processing, when the payment apparatus is not in use. That is, the register may not be able to carry out product registration for another transaction without transmitting the payment information for the transaction, which may cause delay of the entire checkout process. It is desirable to efficiently perform the entire checkout process.

DETAILED DESCRIPTION

An embodiment provides a checkout system capable of efficiently performing processes for purchase registration and payment.

According to an embodiment, a register system includes an image capturing device set to capture images of a checkout space of a retailer, a first register disposed in the checkout space, and configured to scan product codes of products and generate checkout information based on the scanned product codes, a second register in communication with the first register, disposed in the checkout space separately from the first register, and configured to carry out payment processing, and a server in communication with the first and second registers. The server is configured to process the images captured by the image capturing device to transmit the checkout information collected by the first register to the second register upon detecting movement of a person in the images from the first register to the second register.

Hereinafter, an example of an embodiment will be described with reference to the drawings.

Figure 1:
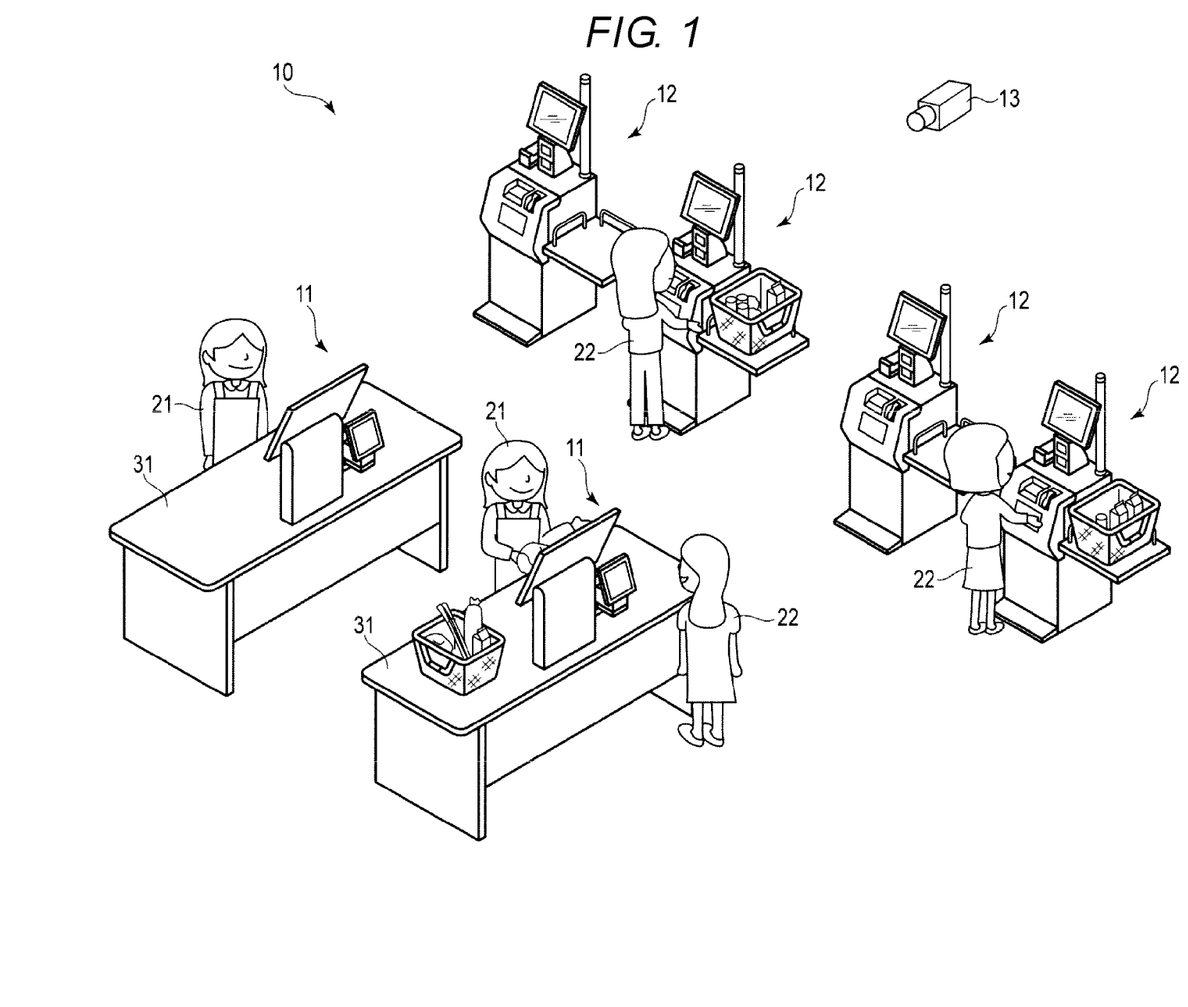
FIG. 1 is a perspective view of a checkout system according to an embodiment.

FIG. 1 illustrates an overview of a checkout system 10 according to an embodiment.

The checkout system 10 includes at least one merchandise registration apparatus 11, a plurality of payment apparatuses 12, and at least one camera (image capturing device) 13. FIG. 1 illustrates the checkout system 10 including two merchandise registration apparatuses 11, four payment apparatuses 12, and one camera 13. The checkout system 10 includes an arbitrary number of merchandise registration apparatuses 11, payment apparatuses 12, and cameras 13 respectively, and a ratio of the number of the merchandise registration apparatus 11 to the number of the payment apparatus 12 is arbitrary. The merchandise registration apparatus 11 and the payment apparatus 12 are located in the checkout space of a store such as a supermarket. It is possible to use a surveillance camera or the like, as the camera 13. In this case, the camera 13 is not included in the checkout system 10.

An operator of the merchandise registration apparatus 11 is a salesperson 21 of the store, who is a so-called checker. An operator of the payment apparatus 12 is a shopper 22 who purchases merchandise sold at the store. In addition, some operations of the merchandise registration apparatus 11 may be performed by the shopper 22. Alternatively, the payment apparatus 12 may be operated by the salesperson 21.

The merchandise registration apparatus 11 is attached to a work table 31 in FIG. 1. A plurality of work tables 31 is arranged to form passages for the shoppers 22.

The merchandise registration apparatus 11 performs purchasing registration, which is a process of registering the merchandise that the shopper 22 entering the passage brings, as merchandise to be purchased.

When the payment apparatus 12 is notified of the payment information from the merchandise registration apparatus 11, the payment apparatus 12 performs the payment process based on the payment information.

The camera 13 is provided, for example, on a ceiling of the checkout space, and captures a bird's eye view of the entire area of the checkout space. The camera 13 repeats image capturing at predetermined time intervals, and repeatedly outputs the image data. In other words, the camera 13 obtains an image in an imaging range including both the merchandise registration apparatuses 11 and the payment apparatuses 12. Therefore, the camera 13 is an example of an imaging unit.

Figure 2:
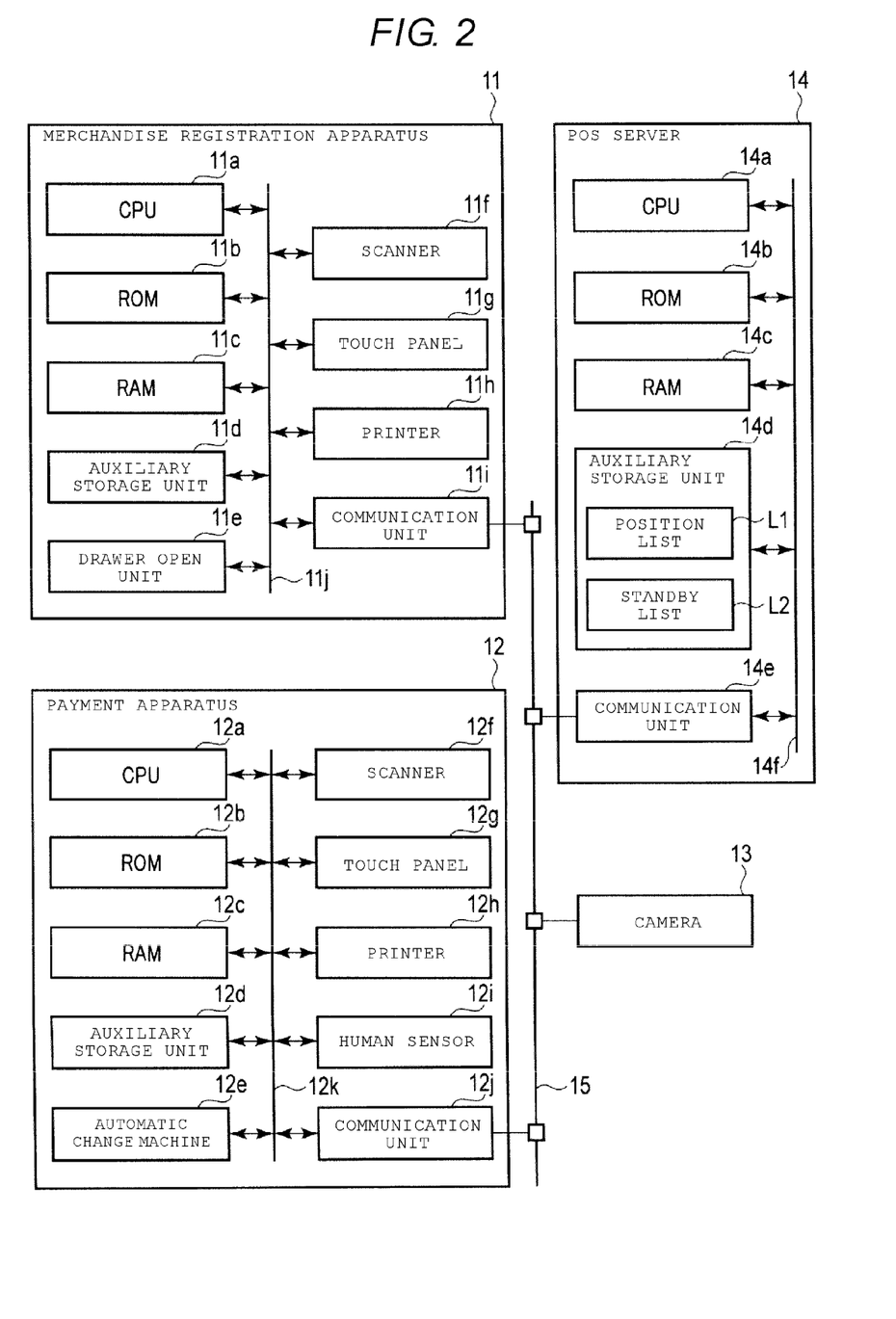
FIG. 2 is a block diagram of the checkout system illustrated in FIG. 1.

FIG. 2 is a block diagram of a main circuit configuration of the checkout system 10.

The checkout system 10 includes a POS server 14 as well as the merchandise registration apparatus 11, the payment apparatus 12, and the camera 13. The POS server 14 is a so-called store server provided in the store, or a so-called headquarters server provided in the headquarters to control a plurality of stores including the store. The POS server 14 aggregates sales data. In addition, the POS server 14 manages data used by the merchandise registration apparatus 11 and the payment apparatus 12. In other words, the POS server 14 has the same function as a conventional POS server. The POS server 14 relays exchange of payment information from the merchandise registration apparatus 11 to the payment apparatus 12.

The merchandise registration apparatus 11, the payment apparatus 12, the camera 13, and the POS server 14 are all connected to a local area network (LAN) 15. Other communication networks such as the Internet may be used instead of the LAN 15. Thus, the merchandise registration apparatus 11 and the payment apparatus 12 can communicate with the POS server 14 through the LAN 15. The POS server 14 can communicate with the camera 13 through the LAN 15.

The merchandise registration apparatus 11 includes a central processing unit (CPU) 11a, a read-only memory (ROM) 11b, a random-access memory (RAM) 11c, an auxiliary storage unit 11d, a drawer open unit 11e, a scanner 11f, a touch panel 11g, a printer 11h, a communication unit 11i, and a transmission system 11j.

The CPU 11a, the ROM 11b, the RAM 11c, and the auxiliary storage unit 11d are connected through the transmission system 11j and configure a computer.

The CPU 11a corresponds to a central functional unit of the computer. The CPU 11a controls respective units of the computer to perform various operations of the merchandise registration apparatus 11, based on the operating system, the middleware, and the application programs, which are stored in the ROM 11b and the RAM 11c.

The ROM 11b corresponds to a main memory of the computer. The ROM 11b stores the operating system. The ROM 11b may store the middleware and application programs in some cases. Further, the ROM 11b may also store data that are referred to when the CPU 11a executes various processes.

The RAM 11c also corresponds to a main memory of the computer. The RAM 11c stores data that are referred to when the CPU 11a executes various processes. Further, the RAM 11c is utilized as a so-called work area for temporarily storing data that is used when the CPU 11a executes various processes.

The auxiliary storage unit 11d corresponds to an auxiliary memory of the computer. The auxiliary storage unit 11d stores data used when the CPU 11a executes various processes or data generated through the process performed by the CPU 11a.

The drawer open unit 11e automatically opens a drawer that stores money.

The scanner 11f reads information on merchandise, and obtains a merchandise code of the merchandise. It is possible to use various well-known types of device as the scanner 11f.

The touch panel 11g includes a display device and a touch sensor. It is possible to use a well-known device as the touch panel 11g.

The printer 11h issues a receipt by printing various strings, images, or the like on a receipt sheet.

The communication unit 11i performs communication through the LAN 15.

The transmission system 11j transmits data pieces which are exchanged between the respective units of the merchandise registration apparatus 11.

In addition, as hardware of the merchandise registration apparatus 11, for example, a conventional POS terminal can be used.

The payment apparatus 12 includes a CPU 12a, a ROM 12b, a RAM 12c, an auxiliary storage unit 12d, an automatic change machine 12e, a scanner 12f, a touch panel 12g, a printer 12h, a human sensor (motion detector) 12i, a communication unit 12j, and a transmission system 12k.

The CPU 12a, the ROM 12b, the RAM 12c, and the auxiliary storage unit 12d are connected through the transmission system 12k and configure a computer. Thus, this computer controls the respective units of the payment apparatus 12 that implement various operations, by using the same function as that of the merchandise registration apparatus 11.

The automatic change machine 12e collects coins and bills that are inserted. Further, the automatic change machine 12e discharges coins and bills as changes.

The scanner 12f reads information on merchandise, and obtains a merchandise code of the merchandise. It is possible to use various well-known devices for the scanner 12f.

The touch panel 12g includes a display device and a touch sensor. It is possible to use a well-known device as the touch panel 12g.

The printer 12h issues a receipt by printing various types of strings, images, or the like on a receipt sheet.

The human sensor (motion detector) 12i turns ON when a person is present in a detection range. The human sensor 12i is provided to be able to detect the shopper 22 who is located in the vicinity of the payment apparatus 12 to operate the payment apparatus 12 as illustrated in FIG. 1. For example, it is possible to use a well-known device such as an infra-red sensor as the human sensor 12i.

The communication unit 12j performs communication through the LAN 15.

The transmission system 12k transmits data pieces are exchanged between respective units of the payment apparatus 12.

In addition, as hardware of the payment apparatus 12, for example, a conventional self-POS terminal can be used.

The POS server 14 includes a CPU 14a, a ROM 14b, a RAM 14c, an auxiliary storage unit 14d, a communication unit 14e, and a transmission system 14f.

The CPU 14a, the ROM 14b, the RAM 14c, and the auxiliary storage unit 14d are connected through the transmission system 14f so as to configure a computer. Thus, this computer controls the respective units that implement various operations as the POS server 14, by using the same function as that of the merchandise registration apparatus 11.

The communication unit 14e performs communication through the LAN 15.

The transmission system 14f transmits data pieces exchanged between the respective units in the POS server 14.

In addition, as hardware of the POS server 14, for example, a conventional general-purpose server device can be used.

The camera 13 has a function of communication through the LAN 15. The camera 13 sends image data generated by imaging, to the LAN 15, with an address of the POS server 14. An existing network camera or the like is available for the camera 13.

The application programs stored in the ROMs 11b, 12b, and 14b or the auxiliary storage units 11d, 12d, and 14d include control programs describing control processes to be described below. The merchandise registration apparatus 11, the payment apparatus 12, or the POS server 14 is transferred in general, in a state where the control programs are stored in the ROMs 11b, 12b, and 14b or the auxiliary storage units 11d, 12d, and 14d. However, the merchandise registration apparatus 11, the payment apparatus 12 or the POS server 14 may be transferred, in a state where the control programs are not stored in the ROMs 11b, 12b, and 14*b* or the auxiliary storage units 11*d*, 12*d*, and 14*d*, and at the same time, the control program may be transferred by being recorded on a removable recording medium or over a network. In this case, for example, the control programs are written into the auxiliary storage units 11*d*, 12*d*, and 14*d* or the auxiliary storage units 11*d*, 12*d*, and 14*d*, in response to the operation by the user. Magnetic discs, magneto-optical discs, optical discs, semiconductor memories, or the like are available for a removable recording medium.

Next, the operation of the checkout system 10 configured as described above will be described. In addition, the processes described below are an example, and it is possible to use various processes capable of achieving the similar results.

When the POS server 14 is started, the CPU 14*a* clears a position list L1 and a standby list L2. Thereafter, if the POS server 14 is in a normal operating state, the CPU 14*a* starts a position detection process based on the control program stored in the ROM 14*b* or the auxiliary storage unit 14*d*, every predetermined start timing. In addition, the start timing of the position detection process is assumed to be timings at every predetermined time interval, but may be arbitrarily set, for example, by a designer of the control program.

Figure 3:
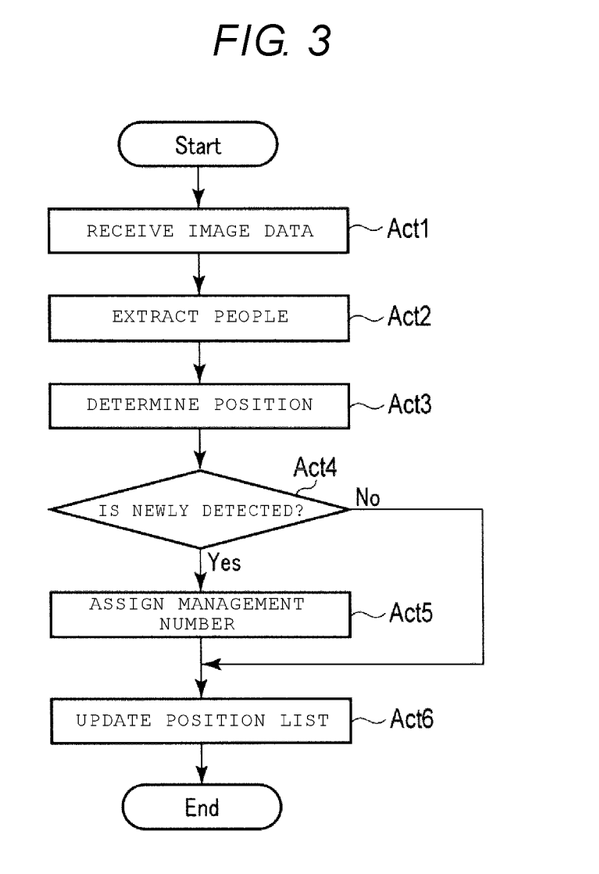
FIG. 3 is flow chart of a position detection process carried out by a CPU included in a POS server of the checkout system illustrated in FIG. 2.

FIG. 3 is a flow chart of a position detection process by the CPU 14*a*.

In Act1, the CPU 14*a* receives image data output by the camera 13.

In Act2, the CPU 14*a* extracts people which are captured in the image corresponding to the image data obtained in Act1. A well-known technique can be applied to this process.

In Act3, the CPU 14*a* determines the position of the person extracted in Act2. If a plurality of persons is extracted in Act2, the CPU 14*a* determines the position of each person. Thus, the computer including the CPU 14*a* as a central portion functions as a determination unit that determines the position of the shopper 22, based on the image obtained by the camera, by the CPU 14*a* executing the position detection process based on the control program.

In Act4, the CPU 14*a* determines whether or not there is a newly detected person among the one or more persons extracted in Act2. Specifically, the CPU 14*a* determines whether or not each person extracted in Act2 is registered in the position list L1. The position list L1 is data describing position information indicating the most recently determined location and tracking information for a person who has been extracted in the past in association with the management number that has been given to the person. The tracking information is information referred to for determining whether the person extracted in Act2 is a person who is registered in the position list L1. Information used as the tracking information is arbitrary, and for example, the information may be defined by the designer or the like of the control program of the CPU 14*a*. It is assumed that for example, information representing the features such as clothes captured in the image, position information for the detected position in the past, or the like is used as the tracking information. If another person other than persons of whom positions are determined so far is extracted, the CPU 14*a* makes a determination as Yes, and the process proceeds to Act5. Since a technique for recognizing whether each of the persons captured in the images which are repeatedly captured in the same imaging range is the same has been already known, this well-known process can be used for the process of Act4.

In Act5, the CPU 14*a* assigns a management number (identifier) other than the management numbers (identifiers) that have been already assigned in the position list L1, to the newly extracted person. After this, the process proceeds to Act6. In addition, the management numbers that are described in the position list L1 are given to all of the persons extracted in Act2, the CPU 14*a* makes a determination of No in Act4, and then the process passes through Act5 and proceeds to Act6.

In Act6, the CPU 14*a* updates the position list L1 such that the position information indicating the position which is determined for each of the persons extracted in Act2 is described in association with the management number which is given to each of the persons. If the update is ended, the CPU 14*a* ends the position detection process of this time. If the management number that is not given to any person who is not extracted in Act2 is included in the position list L1, the CPU 14*a* deletes the management number and the information associated with the management number from the position list L1.

In this manner, the POS server 14 manages the position of the person present within the imaging range of the camera 13 in association with the management number that is given to the person, on the position list L1. That is, the POS server 14 is tracking the people present in the imaging range of the camera 13.

Figure 4:
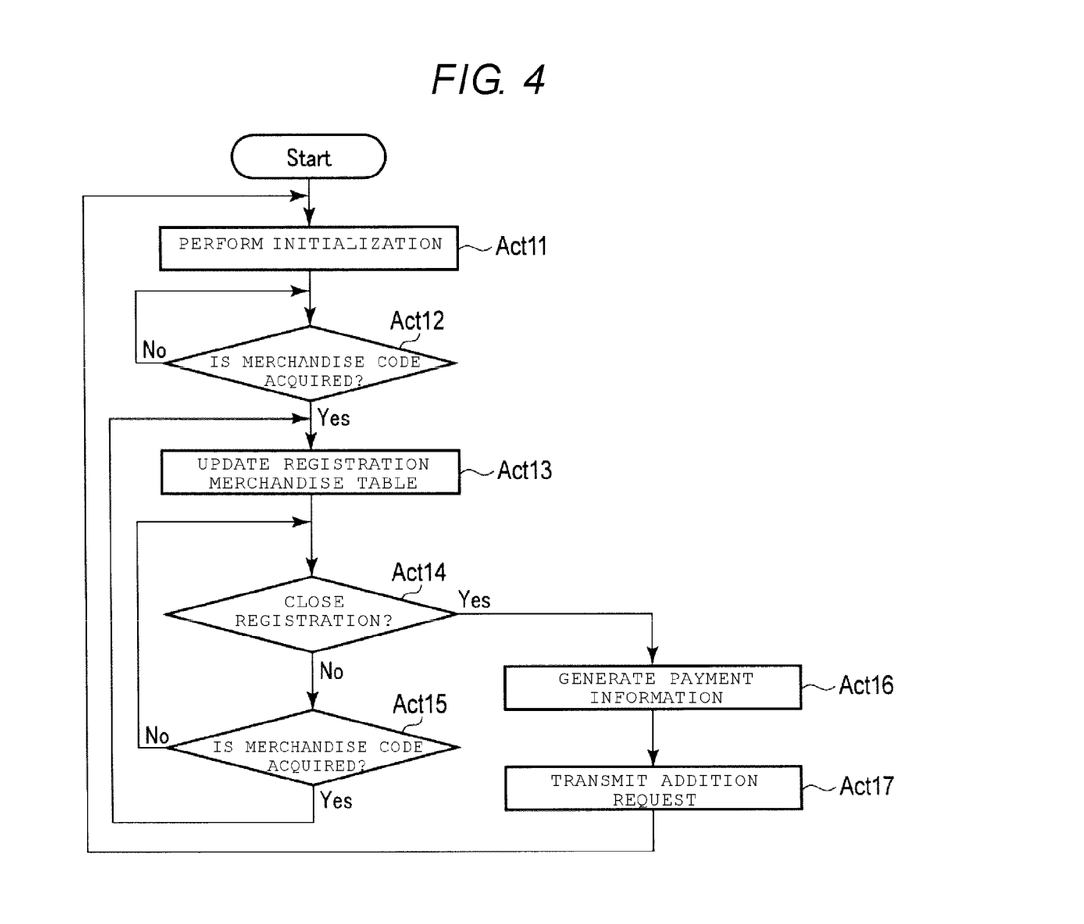
FIG. 4 is a flow chart of a control process carried out by a CPU included in a merchandise registration apparatus of the checkout system illustrated in FIG. 2.

If the merchandise registration apparatus 11 is started in a mode in which the registration process of purchasing merchandise is executed, the CPU 11*a* starts the control process according to a control program stored in the ROM 11*b* or the auxiliary storage unit 11*d*.

FIG. 4 is a flow chart of a control process by the CPU 11*a*.

In Act11, the CPU 11*a* performs initialization. Specifically, the CPU 11*a* clears the registration merchandise table which is set in the RAM 11*c*. The registration merchandise table is a data table for describing information on merchandise of which the purchasing registration is completed.

In Act12, the CPU 11*a* waits for the input of the merchandise code of the merchandise of which purchase is to be registered.

The CPU 11*a* acquires the merchandise code based on the operation by the salesperson 21, through a well-known process other than the control process illustrated in FIG. 4. If the merchandise code is acquired, the CPU 11*a* makes a determination as Yes in Act12, and the process proceeds to Act13.

In Act13, the CPU 11*a* updates the registration merchandise table so as to include information on the merchandise specified by the acquired merchandise code.

In Act14, the CPU 11*a* determines whether or not a settlement operation to declare conclusion of the purchasing registration of one transaction is performed. If it is determined as No since the settlement operation is not performed, the process proceeds to Act15.

In Act15, the CPU 11*a* determines whether or not a new merchandise code is obtained. If it is determined as No since no new merchandise code is obtained, the process proceeds to Act14.

In this manner, in Act14 and Act15, the CPU 11*a* waits for the execution of the settlement operation or the acquisition of a new merchandise code. If a new merchandise code is acquired, the CPU 11*a* makes a determination as Yes in Act15, and the process returns to Act13. In other words, after updating the registration merchandise table so as to include the acquired new merchandise code, the CPU 11*a* returns to the standby state of Act14 and Act15.

If the salesperson 21 repeats an operation to cause the CPU 11a to acquire a merchandise code, the merchandise code is continued to be added to the registration merchandise table. If the purchasing registration of all merchandise which are targets of one transaction is completed, the salesperson 21 performs a settlement operation which is determined in advance, such as touch of an account button on the touch panel 11g. If it is determined as Yes in Act14 since the settlement operation is performed, the process proceeds to Act16.

In Act16, the CPU 11a generates payment information on payment for the registered merchandise, which is included in the registration merchandise table, based on the contents of the registration merchandise table at this time. The payment information contains information required to decide the payment amount of money, such as a registration merchandise list. The payment information may contain information that can be used as the payment amount of money as it is, such as total amount. Thus, the computer including the CPU 11a as a central functional unit functions as a generation unit, by the CPU 11a executing the control process based on the control program.

In Act17, the CPU 11a makes an additional request for adding the payment information in the standby list L2. Specifically, the CPU 11a sends request information containing the payment information generated in Act12 from the communication unit 11i to the LAN 15, with an address of the POS server 14. If the transmission of the request information is completed, the process returns to Act11.

If the request information is also transmitted to the POS server 14 by the LAN 15, the communication unit 14e of the POS server 14 receives the request information.

Figure 5:
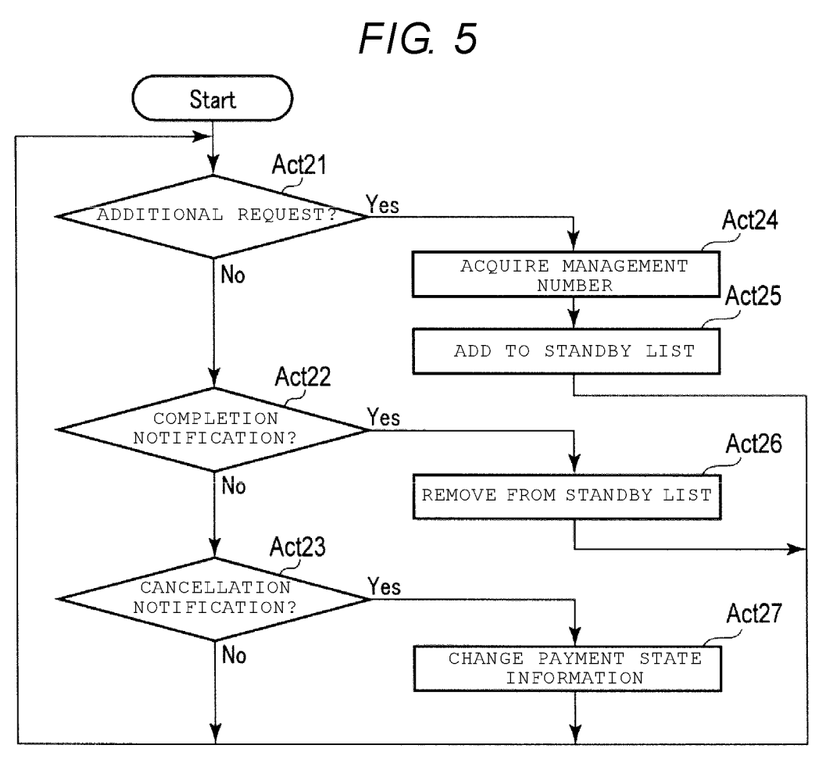
FIG. 5 is flow chart of a list updating process carried out by the CPU included in the POS server.

In the POS server 14, the CPU 14a executes a list updating process based on the control program stored in the ROM 14b or the auxiliary storage unit 14d, separately from the position detection process. It is assumed that the CPU 14a can execute the list updating process and the position detection process at the same time, for example, by executing the list updating process by a task different from the position detection process.

FIG. 5 is a flow chart of the list updating process carried out by the CPU 14a.

In Act21, the CPU 14a determines whether or not the additional request is made by the merchandise registration apparatus 11. If request information including the payment information is not received by the communication unit 14e, the CPU 14a makes a determination of No and the process proceeds to the Act22.

In Act22, the CPU 14a determines whether or not the completion notification to be described later is sent. If it is determined of No since no completion notification is sent, the process proceeds to Act23.

In Act23, the CPU 14a determines whether or not a cancellation notification (described below) is sent. If it is determined of No since no cancellation notification is sent, the process returns to Act21.

Thus, in Act21 to Act23, the CPU 14a waits for the input of an additional request, a completion notification, or cancellation notification. If request information including the payment information is received by the communication unit 14e, the CPU 14a makes a determination of Yes in Act21 and the process proceeds to the Act24.

In Act24, the CPU 14a acquires a management number which is assigned to the shopper 22 who performs payment based on the payment information contained in the request information, for the position detection process. Specifically, the CPU 14a finds the position information indicating a position within the customer range which is determined in advance in association with the merchandise registration apparatus 11 which transmits the request information from the position list L1. If the corresponding position information is found, the CPU 14a acquires the management number contained in the position list L1 in association with the position information as the management number of the shopper 22. When the purchasing registration is performed, the shopper 22 is located near the merchandise registration apparatus 11 as illustrated in FIG. 1. Thus, for example, in the introduction work of the checkout system 10, a worker or the like sets such positions as a customer range. Therefore, the position within the customer range corresponds to the registration position which is determined near the merchandise registration apparatus 11.

In Act25, the CPU 14a adds the payment information included in the request information, to the standby list L2 of the auxiliary storage unit 14d. The standby list L2 is a set of data records including payment information, management number, and payment state information. The payment state information indicates whether or not the payment process using the payment information contained in the same data record is being performed by any payment apparatus 12. The payment state information may be a flag. However, the state may be represented, depending on whether the payment state information contains the identification information of the payment apparatus 12 which is performing the payment process using the payment information, or the other any information is included. Specifically, the CPU 11a adds a new data record containing the payment information contained in the request information, the management number acquired in Act24, and payment state information indicating that the payment process is not being performed, to the standby list L2. Thus, auxiliary storage unit 14d stores payment information in association with a shopper located in the registration position which is determined as the vicinity of the merchandise registration apparatus when the payment information is generated, and corresponds to the storage unit.

Thereafter, the CPU 14a returns to the standby state of Act21 to Act23.

If the transmission of the payment information from the merchandise registration apparatus 11 to the POS server 14 is ended, the salesperson 21 guides the shopper 22 such that the shopper 22 moves to an unoccupied payment apparatus 12 and performs payment using the payment apparatus 12.

The shopper 22 moves from the vicinity of the merchandise registration apparatus 11 to the vicinity of any payment apparatus 12. In this case, with the movement of the shopper 22, the position information associated with the management number given to the shopper 22 on the position list L1 is updated through the position detection process.

Figure 6:
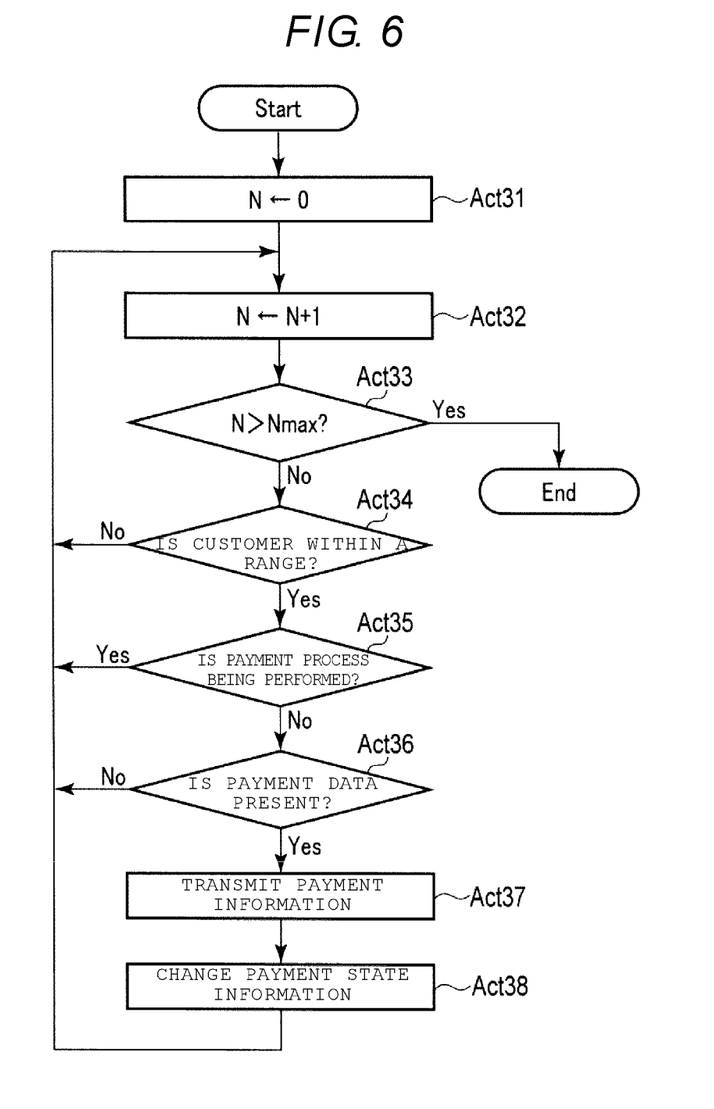
FIG. 6 is flow chart of a delivery process carried out by the CPU included in the POS server.

However, in the POS server 14, the CPU 14a starts a delivery process based on the control program stored in the ROM 14b or the auxiliary storage unit 14d, every predetermined start timing, separately from the position detection process and the list updating process which are described above. In addition, the start timing of the delivery process is assumed to be timings at every predetermined time interval, but may be arbitrarily set, for example, by the designer of the control program. It is assumed that the CPU 14a can execute the delivery process at the same time as the position detection process and the list updating process, by executing the delivery process by a task different from the position detection process and the list updating process.

FIG. 6 is a flow chart of the delivery process carried out by the CPU 14a.

In Act31, the CPU 14a clears the value of the variable N to 0.

In Act32, the CPU 14a increases the value of the variable N by one.

In Act33, the CPU 14a determines whether or not the value of the variable N is greater than a maximum value Nmax which is determined in advance. The maximum value Nmax is the number of payment apparatuses 12 included in the checkout system 10, and for example, is set by the worker. If it is determined as No since the value of the variable N is less than the maximum value Nmax, the process proceeds to Act34.

In Act34, the CPU 14a determines whether or not the person is within a predetermined range of the N-th payment apparatus 12. Specifically, the CPU 14a determines whether or not there is position information indicating the position of the customer that is within a range which is determined in advance in association with the N-th payment apparatus 12, in the position list L1. If the corresponding position information is found, the CPU 14a makes a determination of Yes in Act34, and the process proceeds to Act35. Here, a first number to Nmax-th number are respectively set for the payment apparatuses 12 by the worker. When the payment is performed, the shopper 22 is located near the payment apparatus 12 as illustrated in FIG. 1. Thus, for example, the worker or the like sets such a position as a customer range for each of the payment apparatuses 12. Therefore, the position within the customer range corresponds to the payment position which is determined in correlation with each of the payment apparatuses 12.

In Act35, the CPU 14a determines whether or not the N-th payment apparatus 12 is waiting for the payment information. In addition, the CPU 14a can recognize the operation state of each of the payment apparatuses 12, for example, by querying the payment apparatus 12. If it is determined as No since the N-th payment apparatus 12 is ready to receive the payment information, the process proceeds to Act36.

In Act36, the CPU 14a determines whether or not payment information to be transmitted is present in the N-th payment apparatus 12. Specifically, the CPU 14a acquires the management number which is associated with the position information indicating the position being within the customer range of the N-th payment apparatus 12 from the position list L1, and determines whether or not there is the payment information associated with the management number on the standby list L2. If it is determined as Yes since the corresponding payment information is present, the process proceeds to Act37.

In Act37, the CPU 14a sends the corresponding payment information which is determined in Act36 from the communication unit 14e to the LAN 15, with an address of the N-th payment apparatus 12. Thus, if one of payment positions which are respectively determined in advance in correlation with the plurality of payment apparatuses 12 is determined as the position of a shopper, the CPU 14a decides a payment apparatus 12 which is correlated with the payment position as a payment apparatus 12 that is to perform the payment process. Thus, a computer including the CPU 14a as a central functional unit functions as a decision unit, by the CPU 14a executing the delivery process based on the control program.

In Act38, the CPU 14a changes the payment state information contained in the same data record together with the payment information which is sent in Act37 on the standby list L2, to a state indicating that the payment process is being performed. After this, the CPU 14a repeats the subsequent process of Act32.

In addition, when position information indicating a position being within the customer range which is determined in advance in association with the N-th payment apparatus 12 is not found in the position list L1, the CPU 14a makes a determination of No in Act34. If the N-th payment apparatus 12 is not waiting for the payment information, the CPU 14a makes a determination of No in Act35. If the management number associated with the position information indicating the position being within the customer range of the N-th payment apparatus 12 in the position list L1 is not included in the standby list L2, the CPU 14a makes a determination of No in Act36. In these cases, the CPU 14a repeats the subsequent process of Act32, without executing Act37. Thus, the CPU 14a repeats the process of Act33 to Act37, by using all of the payment apparatuses 12 included in the checkout system 10 as a target sequentially.

Thus, if the CPU 14a executes Act32 after the process of Act33 to Act37 is ended for all of the payment apparatuses 12, the value of the variable N is greater than the maximum value Nmax. In this case, the CPU 14a makes a determination of Yes in Act33, and ends the delivery process illustrated in FIG. 6.

Figure 7:
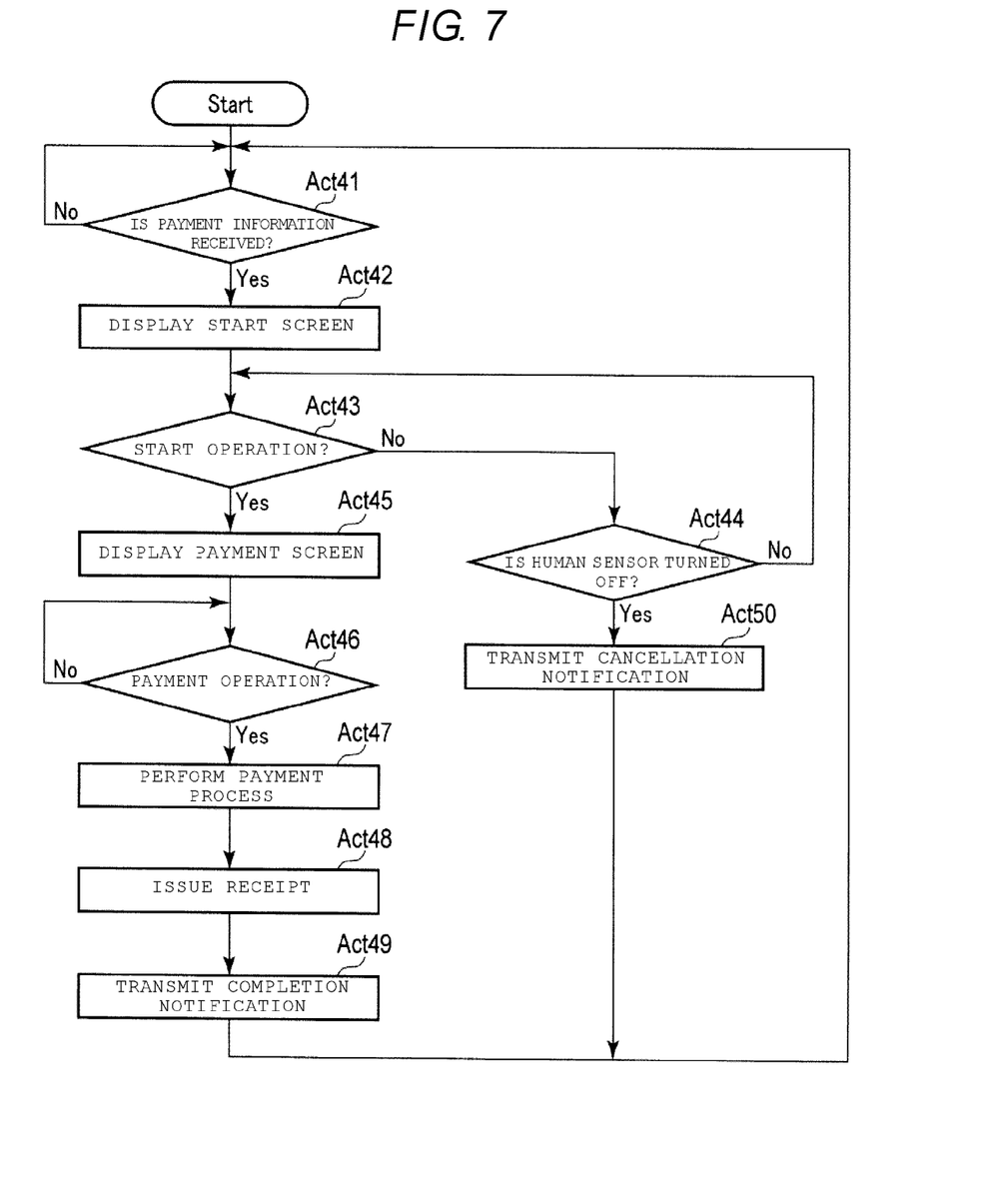
FIG. 7 is flow chart of a control process carried out by a CPU included in a payment apparatus of the checkout system illustrated in FIG. 2.

Meanwhile, if the payment apparatus 12 is started, the CPU 12a starts the control process according to a control program stored in the ROM 12b or the auxiliary storage unit 12d.

FIG. 7 is a flow chart of a control process by the CPU 12a.

In Act41, the CPU 12a waits for reception of the payment information.

At this time, the shopper 22 moves to the vicinity of an unoccupied payment apparatus 12, according to the guide by the salesperson 21 as described above. Thus, since the proximity of the shopper 22 to the payment apparatus 12 is detected by the POS server 14, the payment information is sent from the POS server 14, with an address of the payment apparatus 12. If the payment information is transmitted from the LAN 15 to the payment apparatus 12, the communication unit 12j of the payment apparatus 12 receives the payment information, and stores the payment information in the RAM12c or the auxiliary storage unit 12d.

If the payment information is received in this way, the CPU 12a makes a determination of Yes in Act41, and the process proceeds to Act42.

In Act42, the CPU 12a displays the start screen on the touch panel 12g. The start screen is intended to notify the shopper 22 that the payment process is ready. The start screen represents, for example, a text message indicating that the shopper 22 moving close to the payment apparatus 12 can perform the payment, and a start button for the shopper 22 to make an instruction on the start of payment. Thus, a function as a display unit is achieved by the cooperation of the computer including the CPU 12a as a central functional unit and the touch panel 12g, by the CPU 12a executing the control process based on the control program.

In Act43, the CPU 12a determines whether or not the start operation is made. If it is determined as No since an operation to instruct the start of payment by the shopper 22 is not made, the process proceeds to Act44.

In Act44, the CPU 12a determines whether or not the human sensor 12i is turned OFF. If it is determined as No since the human sensor 12i is turned ON, the process returns to Act43.

Thus, in Act43 and Act44, the CPU 12a waits for the execution of the start operation or the turning-off of the human sensor 12i.

If it is determined as Yes in Act43 since a start operation such as the touch of the start button displayed on the start screen is made, the process proceeds to Act45.

In Act45, the CPU 12a displays the payment screen on the touch panel 12g. The payment screen is intended for receiving an operation by the shopper 22 for performing payment based on the above received payment information. The payment screen represents, for example, at least the total amount indicated by the payment information. Further, the payment screen may include a list of the total number and purchasing merchandise. In addition, if the payment is possible by a plurality of payment methods, the payment screen includes a button for the shopper 22 to select a payment method.

In Act46, the CPU 12a waits for the operation for payment by the shopper 22.

The shopper 22 performs operations for payment on the payment screen described above. If the operation for payment is executed in this way and the execution is detected on the touch panel 12g, the CPU 12a makes a determination of Yes in Act46, and the process proceeds to Act47.

In Act47, the CPU 12a executes the payment process. Here, the payment process is a process for payment of the transaction indicated by the payment information which is stored in the RAM12c or the auxiliary storage unit 12d, in response to the operation by the shopper 22. Here, for the payment process, for example, a process which is executed in an existing self POS terminal or the like can be applied as it is. Thus, the computer including the CPU 12a as a central functional unit functions as a payment unit, by the CPU 12a executing the control process based on the control program.

If the amount of money to be used as the payment amount of money is indicated in the payment information, the CPU 12a performs the above payment process as the process for paying the amount. However, if the amount to be used as the payment is not indicated in the payment information, the CPU 12a performs the process of calculating the payment amount. If the CPU 12a calculates the payment amount in this manner, the payment apparatus 12 is also referred to as an accounting apparatus.

In this way, the payment apparatus 12 that receives the payment information from the POS server 14 performs the payment process based on the payment information. In other words, sending the payment information to the payment apparatus 12 corresponds to controlling the payment apparatus 12 so as to perform the payment process based on the payment information. Thus, the computer including the CPU 14a as a central functional unit functions as a control unit, by the CPU 14a of the POS server 14 executing the delivery process illustrated in FIG. 6.

In Act48, the CPU 12a controls the printer 12h so as to issue a receipt representing information indicated in the payment information which is stored in the RAM12c or the auxiliary storage unit 12d, or the result of the above payment process.

In Act49, the CPU 12a sends a completion notification to the POS server 14. Specifically, the CPU 12a sends completion information which is determined for completion notification, from the communication unit 12j to the LAN 15, with an address of the POS server 14. After this, the CPU 12a returns to the standby state of Act41.

When the shopper moves away from the payment apparatus 12 without performing the start operation after the shopper 22 who ends the merchandise registration once moves close to the payment apparatus 12, the human sensor 12i is turned OFF. In this case, the CPU 12a makes a determination of Yes in Act44, and the process proceeds to Act50.

In Act50, the CPU 12a sends a cancellation notification to the POS server 14. Specifically, the CPU 12a sends cancellation information which is determined for cancellation notification, from the communication unit 12j to the LAN 15, with an address of the POS server 14. After this, the CPU 12a returns to the standby state of Act41.

If the completion information or the cancellation information is transmitted to the POS server 14 through the LAN 15, the communication unit 14e of the POS server 14 receives the completion information or the cancellation information. If the completion information is received by the communication unit 14e, the CPU 14a makes a determination of Yes in Act22 of FIG. 5 and the process proceeds to Act26.

In Act26, the CPU 14a removes the data record containing the payment information that is transmitted to the payment apparatus 12 which transmits the completion information, from the standby list L2. In addition, the CPU 14a determines, for example, a data record containing the management number associated with the position information indicating the position within the customer range which is determined in advance in association with the payment apparatus 12 that transmits the completion information, in the position list L1, as a delete target. Alternatively, if the payment state information indicates identification information of the payment apparatus, the CPU 14a determines a data record containing payment state information indicating the identification information of the payment apparatus 12 that transmitted the completion information, as a delete target. After this, the CPU 14a returns to the standby state of Act21 to Act23.

If the cancellation information is received by the communication unit 14e, the CPU 14a makes a determination of Yes in Act23 and the process proceeds to Act27.

In Act27, the CPU 14a changes the payment state information contained in the data record of the standby list L2 together with the payment information that is transmitted to the payment apparatus 12 which transmits the cancellation information, to indicate a state in which the payment process is not being performed. In addition, the CPU 14a decides a data record containing the payment state information to be changed in the same manner as the method of deciding a data record which is a delete target as described above.

Here, if the customer range for each of the payment apparatuses 12 is set to be almost the same as the detection range of the human sensor 12i provided in the payment apparatus 12, when the presence of a shopper in the payment position cannot be determined, it is determined as Yes by the CPU 12a in Act44 in FIG. 7. In this case, the CPU 14a cancels the decision made as a payment apparatus that is to perform the payment process, by changing the payment state information as described above. Thus, the computer including the CPU 14a as a central functional unit functions as a cancellation unit, by the CPU 14a executing the list updating process based on the control program.

After this, the CPU 14a returns to the standby state of Act21 to Act23.

According to the checkout system 10 described above, the following effects are achieved.

If the purchasing registration of one transaction is ended and the payment information is added to the standby list L2 of the POS server 14, it is possible to start immediately the purchasing registration about another transaction in the merchandise registration apparatus 11, without waiting for the completion of the payment based on the payment information. Further, since the shopper 22 moves to an unoccupied payment apparatus 12, and performs the start operation in the start screen, it is possible to start immediately the payment in any payment apparatus 12. Therefore, it is possible to efficiently perform processes for purchasing registration and payment.

Since there is no need for the salesperson 21 to select the transfer destination of the payment information, the workload of the salesperson 21 can be reduced, as compared to the case where it is necessary to select the transfer destination.

Since the shopper 22 can select freely the payment apparatus 12 to be used for the payment, it is highly convenient for the shopper 22, as compared to the case where the payment apparatus is determined by the salesperson 21 or the checkout system 10.

Since the POS server 14 specifies the payment apparatus 12 to transfer the payment information, based on the position of the shopper 22, it is highly convenient for the salesperson 21 and the shopper 22, as compared to the case of using a recording medium having identification codes of payment information or payment information as it is recorded thereon for the specification.

It is possible to implement the following various modifications of the present embodiment.

The CPU 11a or the CPU 12a may execute the position detection process.

The merchandise registration apparatus 11 may store the standby list L2 of the payment information generated by itself, in the auxiliary storage unit 11d. In other words, in this case, the auxiliary storage unit 11d functions as a storage device. The delivery of the payment information to the payment apparatus 12 to which the shopper 22 moves close may be performed by the merchandise registration apparatus 11 under the processing of the CPU 11a. In this case, the detection of the proximity of the shopper 22 to the payment apparatus 12 may be performed by any one of the CPUs 11a, 12a, and 14a. When the detection is performed by the CPU 12a or the CPU 14a, the payment apparatus 12 or the POS server 14 instructs transmission of the payment information to the merchandise registration apparatus 11.

The payment apparatus 12 may start the payment process depending on proximity of the shopper 22 to the payment apparatus 12 under the control of the CPU 12a, while causing the merchandise registration apparatus 11 or the POS server 14 to store the standby list L2 of the payment information. In this case, determination of the proximity of the shopper 22 to the payment apparatus 12 may be performed by any one of the CPUs 11a, 12a, and 14a. The CPU 12a of the payment apparatus 12 acquires the payment information about the shopper 22 moving close to the payment apparatus 12 from the merchandise registration apparatus 11 or the POS server 14.

The merchandise registration apparatus 11 may transmit the payment information to all of the plurality of payment apparatuses 12. In this case, each of the payment apparatus 12 stores the standby list L2 in the auxiliary storage unit 12d. In other words, in this case, the auxiliary storage unit 12d functions as a storage device. The start of the payment process depending on the proximity of the shopper 22 to the payment apparatus 12 may be performed under the control of the CPU 12a. In this case, the determination of the proximity of the shopper 22 to the payment apparatus 12 may be performed by any one of the CPUs 11a, 12a, and 14a. When the determination is performed by the CPU 11a or the CPU 14a, the start of the payment process is instructed from the merchandise registration apparatus 11 or the POS server 14 to the payment apparatus 12.

Each of the merchandise registration apparatus 11 and the payment apparatus 12 may have a camera to capture the face of the shopper. The merchandise registration apparatus 11 stores the image obtained by capturing the face of the shopper in association with, for example, the management number of the shopper. Whether or not the proximity determination of the shopper to the payment apparatus 12, based on the position of the shopper which is detected through the position detection process, is properly performed may be determined, by collating the image and the image obtained by capturing the shopper 22 in the payment apparatus 12. The image obtained by the merchandise registration apparatus 11 may be stored in any one of the merchandise registration apparatus 11, the payment apparatus 12, and the POS server 14. Any one of the CPUs 11a, 12a, and 14a may execute the determination process.

The storage device that stores the standby list L2 may be provided in any information processing apparatus other than the merchandise registration apparatus 11, the payment apparatus 12, and the POS server 14. However, the information processing apparatus is capable of communicating with the merchandise registration apparatus 11 and the payment apparatus 12.

A portion or all of the respective functions which are performed by the CPU 11a, the CPU 12a or the CPU 14a can also be performed by hardware executing information processing that is not based on a program such as a logic circuit. Each of the respective functions may be implemented by combining hardware such as a logic circuit and software control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A register system comprising:
   an image capturing device set to capture images of a checkout space of a retailer;
   a first register disposed in the checkout space, and configured to scan product codes of products and generate checkout information based on the scanned product codes;
   a second register in communication with the first register, disposed in the checkout space separately from the first register, and configured to carry out payment processing; and
   a server in communication with the first and second registers and configured to process the images captured by the image capturing device and cause the checkout information generated by the first register to be transmitted to the second register upon detecting movement of a person in the images from the first register to the second register.

2. The register system according to claim 1, wherein the server is further configured to assign an identifier to each person in the images, and associate an identifier of a person who is within a predetermined range of the first register with the checkout information when the checkout information is transmitted from the first register to the server.

3. The register system according to claim 2, wherein the server transmits the checkout information to the second register when the person within the predetermined range of the first register moves to within a predetermined range of the second register.

4. The register system according to claim 2, wherein the server tracks a position of said each person in the images by extracting each person from each image captured by the image capturing device and determining the position of said each person in each image captured by the image capturing device.

5. The register system according to claim 4, wherein the server assigns a new identifier to a customer that has been newly extracted.

6. The register system according to claim 2, wherein the second register is further configured to transmit a completion notice upon completion of the payment processing, and
the server is further configured to dissociate the identifier of the customer that has been associated with the checkout information, from the checkout information, upon reception of the completion notice.

7. The register system according to claim 1, wherein the server is further configured to change a status of the checkout information to an in-process state upon transmission of the checkout information.

8. The register system according to claim 7, wherein the second register includes a motion detector and is further configured to transmit a cancellation notice when no motion is detected by the motion detector after the second register receives the checkout information, and
the server is further configured to change a status of the checkout information to a non-processed state, upon reception of the cancellation notice.

9. The register system according to claim 1, wherein the server transmits the checkout information to the second register, upon determining that the second register is not currently carrying out payment processing.

10. The register system according to claim 1, wherein the second register includes a touch panel display and is further configured to display a start screen on the touch panel display upon reception of the checkout information, the payment processing being started upon a user operation in the start screen.

11. A method for operating a checkout process comprising:
capturing images of a checkout space of a retailer in which a first register and a second register are located separately from each other;
generating checkout information based on product codes scanned at the first register;
processing the captured images to detect movement of a person in the captured images from the first register to the second register; and
causing the checkout information to be transmitted to the second register upon detecting movement of the person in the captured images from the first register to the second register.

12. A non-transitory computer-readable medium comprising a program that is executable in one or more computing devices to cause the computing devices to perform a method for operation payment processing, the method comprising:
capturing images of a checkout space of a retailer in which a first register and a second register are located separately from each other;
generating checkout information based on product codes scanned at the first register;
processing the captured images to detect movement of a person in the captured images from the first register to the second register; and
causing the checkout information to be transmitted to the second register upon detecting movement of the person in the captured images from the first register to the second register.

13. The register system according to claim 1, further comprises:
a third register in communication with the first register, disposed in the checkout space separately from the first register and the second register, and configured to carry out payment processing, wherein
the server is further configured to cause the checkout information generated by the first register to be transmitted to the third register upon detecting movement of the person in the images from the first register to the third register.

14. The register system according to claim 1, wherein the checkout information is transmitted from the first register to the second register via the server, and
the first register is further configured to initialize a table for the checkout information upon transmitting the checkout information.

15. The method according to claim 11, wherein a third register is located separately from the first and second registers in the checkout space, and
the method further comprises causing the checkout information to be transmitted to the third register upon detecting movement of the person in the captured images from the first register to the third register.

16. The method according to claim 11, wherein the checkout information is transmitted from the first register to the second register via a server, and
the method further comprises initializing a table for the checkout information that is set in the first register upon transmission of the checkout information from the first register.

17. The non-transitory computer-readable medium according to claim 12, wherein
a third register is located separately from the first and second registers, and
the method further comprises causing the checkout information to be transmitted to the third register upon detecting movement of the person in the captured images from the first register to the third register.

18. The non-transitory computer-readable medium according to claim 12, wherein
the checkout information is transmitted from the first register to the second register via a server, and
the method further comprises initializing a table for the checkout information that is set in the first register upon transmission of the checkout information from the first register.

* * * * *